United States Patent [19]
Fourier et al.

[11] 3,926,879
[45] Dec. 16, 1975

[54] AQUEOUS SEALANT COMPOSITIONS

[75] Inventors: Walter A. Fourier, Crystal Lake, Ill.; Daniel J. Dickmann, Appleton, Wis.

[73] Assignee: M&T Chemicals Inc., Greenwich, Conn.

[22] Filed: Apr. 1, 1974

[21] Appl. No.: 456,604

[52] U.S. Cl. .............. 260/27 R; 261/4; 261/23.7 M
[51] Int. Cl.$^2$ .......................................... C08L 93/00
[58] Field of Search.... 260/27 R, 23.7 M, 29.6 RW, 260/34.2, 29.6 R, 29.6 XA, 4

[56] References Cited
UNITED STATES PATENTS

| | | | |
|---|---|---|---|
| 3,092,507 | 6/1963 | Pojurowski | 260/27 R |
| 3,272,767 | 9/1966 | Howland | 260/23.7 M |
| 3,325,429 | 6/1967 | Harris | 260/23.7 M |
| 3,325,430 | 9/1967 | Grasley | 260/25 |

OTHER PUBLICATIONS

Skeist, Handbook of Adhesives, 1962, (p. 466 relied on).

*Primary Examiner*—Donald E. Czaja
*Assistant Examiner*—William E. Parker
*Attorney, Agent, or Firm*—Robert P. Auber; Kenneth G. Wheeless; Robert Spector

[57] ABSTRACT

Aqueous sealant compositions wherein the thickening agent is a polymer containing repeating units derived from the ammonium salt of acrylic or methacrylic acid adhere well to coated metal substrates. Following evaporation of the aqueous phase the sealant exhibits a unique ability to swell when in contact with the liquid contents of a closed container, thereby ensuring that an impervious seal will be maintained at the seams of the container.

6 Claims, No Drawings

AQUEOUS SEALANT COMPOSITIONS

BACKGROUND

This invention relates to sealant compositions for metal containers. This invention further relates to sealant compositions which expand when in contact with liquids to ensure maintenance of an air tight seal at the double seams of metal containers.

Many materials which are packaged in metal containers, particularly liquid-containing foodstuffs, are susceptible to a deterioration of quality if the materials are allowed to come in contact with even minute amounts of air. Containers for these materials must therefore be hermetically sealed. In the past this has been accomplished by applying a rubber-based sealant at the seams of the container. These sealants contain a natural or synthetic rubber in addition to fillers, tackifying resins, thickeners, and other optional additives. The compositions are applied as a solution or dispersion in an organic liquid or water. The liquid is subsequently evaporated to produce the final seal. Void spaces in the seal may develop as a result of imperfect seam construction or during normal use which includes filling and handling of the container up until the time the container is opened by the consumer. These void spaces destroy the imperviousness of the seal.

In addition to providing a seal which resists penetration by air and water, sealants for containers of edible goods should exhibit the following properties:
 1. Resistance to solubilization by edible fats and oils.
 2. Suitable extractive levels as required by the United States Food and Drug Administration for food contact surfaces, i.e., insolubility in common solvents such as water, alcohol, etc.
 3. Resistance to heat, thereby achieving acceptance for aseptic container steam sterilization and thermal heat processing of the packaged products.
 4. Good adhesion to the various types of resinous coated substrates as well as to laminated and/or unprimed substrates.
 5. Curing and drying at low temperatures for ease and economy in manufacture.
 6. Facility of application using conventional equipment.

Unless they contain a relatively large amount of a wetting agent, prior art sealant compositions which contain methyl cellulose or other cellulose esters as the thickening agent are less than satisfactory since these compositions often will not form a continuous coating on the oleo-resinous lacquers, enamels, epoxy esters, vinyl and other resins that are conventionally employed to coat the surfaces of metal containers. The presence of these wetting agents in the final sealant is undesirable because they render the sealant susceptible to solubilization by the water present in materials with which the container will eventually be filled, thereby impairing or destroying the integrity of the seal.

Prior art aqueous sealant compositions are often prepared by milling a solid rubber, fillers and other dry ingredients to obtain a homogeneous composition to which small amounts of water are gradually added. As the addition of water proceeds, the initial dispersion or solution of water in the plasticized rubber undergoes a phase inversion wherein the rubber becomes the dispersed phase. The addition of water must be gradual and the temperature maintained within relatively narrow limits to prevent coalescence of the dispersed rubber particles. This process is time consuming in addition to requiring careful control and the use of expensive roller mills and other equipment.

It is an object of the present invention to provide air-tight seals at the seams of metal containers filled with liquid materials. Another object of this invention is to define a relatively rapid and inexpensive method for preparing sealant compositions for metal containers. Unexpectedly it has now been found that when the seams of containers for aqueous liquids are coated with a sealant composition containing a rubbery polymer, a tackifying resin and a copolymer wherein a portion of the repeating units contain acrylic or methacrylic acid radicals which have been reacted to form the ammonium salt of the acid, the sealant will swell when in contact with the liquid contents of the container to produce the desired air-tight seal.

SUMMARY OF THE INVENTION

This invention provides an improved sealant composition for metal containers, said composition consisting essentially of an aqueous dispersion comprising 100 parts by weight of a dispersed elastomeric polymer selected from the group consisting of natural rubbers and synthetic rubbers; between 30 and 75 parts of a tackifying resin; between 5 and 20 parts of a thickener; and between 30 and 100 parts of a filler selected from the group consisting of hydrated alumina, silica, zinc oxide and titanium dioxide, wherein the concentration of dissolved and dispersed solids in the sealant composition constitutes between 35 and 70 percent by weight of said composition. The improvement resides in selecting the thickener from the group consisting of copolymers wherein repeating units derived from the ammonium salt of acrylic or methacrylic acid constitute between 25 and 60 percent by weight of the polymer, the remaining repeating units being derived from esters of acrylic acid or methacrylic acid with alcohols containing between 1 and 20 carbon atoms. A 1% aqueous solution of the sodium salt of the copolymer exhibits a viscosity of between 80 and 2700 centipoises.

DETAILED DESCRIPTION OF THE INVENTION

The compositions employed as sealants in accordance with this invention consist essentially of an elastomeric or rubbery polymer, which is a natural or synthetic rubber, a tackifying resin which is preferably a salt of rosin acids or esters derived from rosin acids and polyhydric alcohols, a filler, and a thickening agent to achieve the desired flow properties and viscosity.

Typical sealant compositions of this invention exhibit the following composition:

| INGREDIENT: | PARTS BY WEIGHT |
|---|---|
| Elastomeric polymer | 100 |
| Tackifying resin | 30–75 |
| Thickener | 5–20 |
| Filler | 30–100 |
| Surfactants: | |
| a) for elastomeric polymer | 0.1–10 |
| b) for other ingredients | 0.01–0.4 |
| Antioxidants | 0–3 |
| OPTIONAL INGREDIENTS: | |
| Titanium Dioxide | 1–15 |
| Carbon black or other colored pigments | 0.01–0.15 |
| RATIO OF DISSOLVED AND DISPERSED SOLIDS TO NON-SOLIDS | |
| Solids (% by weight) 35–70%, preferably 40–60% | |

The present thickening agents are unique in that they impart to sealant compositions the ability to swell to the extent of between 110 and 150 percent of their dry volume when in contact with a liquid. When the composition has been applied to the seams of metal containers for liquid materials, and the liquid phase removed by evaporation, the swelling ensures that an air-tight seal will be maintained so long as the container remains filled with liquid.

The present thickening agents are employed at a concentration of between 5 and 20 percent, based on the weight of the elastomeric polymer. The thickening agents are polymers wherein between 25 and 60 percent by weight of the repeating units are derived from the ammonium salt of acrylic or methacrylic acid. The remaining repeating units are derived from ethylenically unsaturated compounds which can be copolymerized with the acid. Preferred comonomers are esters of acrylic and/or methacrylic acid with alcohols containing between 1 and 20 carbon atoms. The molecular weight of the copolymer is such that a 1 percent aqueous solution of the sodium salt thereof exhibits a viscosity of between 80 and 2,700 centipoises. The salt is prepared by reacting the polymer with a stoichiometric amount of sodium hydroxide, based on the number of acid radicals present in the polymer.

The concentration of repeating units derived from acrylic acid or methacrylic acid required to yield the desired degree of swelling in the final sealant is a function of several parameters, including the concentration of the thickener in the final sealant and the molecular weight of the polymer itself. Polymers containing between 27 and 58 percent by weight of repeating units derived from acrylic or methacrylic acid are commercially available. In addition to viscosity as specified hereinbefore the criteria for distinguishing operable from inoperable thickeners is the ability of the polymer in the unneutralized or free acid form of the polymer to swell to between 110 and 150 percent of its dry volume when in contact with water while remaining substantially insoluble in this medium. This degree of swelling is sufficient to ensure that the final sealant will exhibit the degree of swelling required to form a void-free seam on the container. The extent to which a given polymer will swell in a given solvent can readily be determined using known techniques.

The elastomeric polymer component of the present sealants is a natural rubber (polyisoprene) or one of the large variety of available synthetic rubbers. The synthetic materials include copolymers of butadiene with isoprene, styrene and acrylonitrile, terpolymers of butadiene with styrene and acrylonitrile, isobutylene-isoprene copolymers, ethylene-propylene copolymers, neoprene polymers and polyacrylic rubbers. Mixtures containing two or more of the foregoing polymers are also suitable. A copolymer containing 98% by weight of isobutylene and 2 percent by weight of isoprene is particularly preferred for use in the present sealant compositions because of its mechanical stability, in that aqueous latices of this polymer are not susceptible to coagulation under the high shear encountered when the latices are pumped from a holding or storage tank into the vessel in which they are blended with the other ingredients of the present compositions. An example of such a copolymer is BP-100, available from the Exxon Chemical Company. For ease in processing the elastomeric polymer is preferably employed in the form of an aqueous emulsion or latex.

Tackifying resins are incorporated into the present sealants to improve their adhesion to metal substrates and to plasticize the elastomeric polymer. Resins suitable for this purpose include rosin which has been reacted with 1) basic metal compounds such as hydroxides or oxides to form a salt of the rosin acids, such as zinc resinate, or 2) mono- or polyhydric alcohols to form a partial ester. Partially hydrogenated rosin is also useful. Other tackifying resins include water dispersible beta-pinene and other pinene polymers, coumarone-indene polymers and phenol-aldehyde resins. Aqueous dispersions containing the tackifying resin can be prepared using conventional surfactants, including the sodium salts of polymers containing acrylic acid or other ethylenically unsaturated carboxylic acids. The surfactant is employed at concentrations of between 0.01 and 0.1 percent, based on the weight of the tackifying resin, which in turn constitutes between 30 and 75 parts for every 100 parts by weight of elastomeric polymer.

The present sealants preferably contain between 30 and 100 parts per 100 parts by weight of elastomeric polymer, of a filler to impart the desired degree of cohesiveness to the sealant once it has been applied to the end closure of a container and the water evaporated. If the filler is omitted, an excessive amount of material may be forced out from the seam which is formed when the open end of the filled container is sealed. Suitable fillers include hydrated alumina and zinc oxide. Hydrated aluminas, such as the one available as Hydral 710 from the Aluminum Company of America, are especially preferred since these materials have been found to be the most effective insofar as decreasing the susceptibility of the sealant to the plasticizing action of moisture.

In addition to the aforementioned elastomeric polymer, thickener, tackifying resin, surfactant and filler the present sealants optionally contain pigments to facilitate a visual inspection which ensures that the sealant is evenly distributed around the periphery of the end closure. Pigments such as titanium dioxide and carbon black in concentrations up to 15 and 0.15 percent, respectively, based on the weight of elastomeric polymer, are suitable for this purpose. The pigments are omitted if a clear film is desired.

The present sealant compositions optionally contain one or more antioxidants for the elastomeric polymer and the other components of the sealant. Conventional antioxidants for the elastomeric polymer included hindered phenols and phenylene diamines such as symmetrical di-beta-naphthyl-para-phenylene diamine. Other antioxidants which may be present include metal salts of dithiocarbamates such as zinc di-n-butyl dithiocarbamate, available as butyl zimate from R. T. Vanderbilt Company. If the sealant is to be applied to containers for edible materials the antioxidant should have the approval of the United States Food and Drug Administration or other appropriate national health agency for use in this application.

To achieve optimum performance the combination of elastomeric polymer, thickener, tackifying resin, antioxidant and surfactant together with any optional ingredients such as pigments and dispersing aids should constitute between 35 and 70 percent, preferably between 40 and 60 percent by weight of the aqueous composition employed to apply the sealant. At solids contents above 70 percent the composition becomes so viscous that it cannot be applied evenly around the periphery of a container end closure using the conventional lining equipment employed in the container industry. The thickness of films formed using compositions containing less than 35 percent by weight of solids is insufficient to form a satisfactory seal. The repeated applications required to deposit the desired amount of sealant would significantly increase the cost of manufacturing the container.

The present sealant compositions are conveniently prepared by blending an aqueous emulsion or latex containing the elastomeric polymer with an aqueous dispersion which is in turn prepared by gradually adding the thickener, tackifying resin, antioxidant and other solid ingredients to water containing a suitable surfactant such as the aforementioned sodium salts of acrylic acid homopolymers or copolymers. Other types of cationic surfactants including alkali metal salts of alkyl sulfonic acids, such as sodium lauryl sulfonate, and salts of the various alkyl benzene sulfonates are also suitable.

The present method for preparing sealant compositions represents a significant improvement over prior art procedures such as that disclosed in U.S. Pat. No. 2,692,245, wherein a solid or dry rubber is blended with the other solid ingredients exclusive of thickener on a roller mill. A solution or dispersion of the thickener in water is then gradually added until a phase inversion occurs. The rate of addition of water and the temperature must be carefully controlled to prevent coagulation. By contrast, the present method requires considerably less control, since all of the ingredients are initially dispersed or dissolved in water.

EXAMPLE

The following formulation represents a preferred embodiment of the present sealant compositions and should not be interpreted as limiting the scope of the invention as defined in the appended claims. All parts and percentages in the formulation are by weight.

tion and for a period of time thereafter until the dispersion became homogeneous. To the stirred mixture was added the anti-foam agent followed in turn by the butyl zimate, tackifying resin dispersion and the isobutylene-isoprene copolymer. Stirring was continued until a homogeneous composition was obtained, and was continued during addition of thickener, ammonium hydroxide and carbon black, in that order.

The performance of the foregoing formulation was compared with that of a commercially available rubber base sealant (RBC102OB, supplied by the Dewey and Almy Company) containing about 40 percent by weight of non-volatile solids. The rubber component is present as a solution in an organic solvent.

The integrity of seals prepared using the two aforementioned formulations was evaluated by applying each formulation, individually, around the perimeter of 500 circular aluminum container ends measuring 2.7 inches in diameter. The amount of formulation, deposited as a 0.2 inch-wide strip on each end, was equivalent to between 72 and 83 mg. of solid material for the present sealant and between 81 and 94 mg. for the commercial material. The formulations were applied using conventional container lining equipment. The coated ends were allowed to air dry after which they were employed to seal the open end of metal containers filled with 355 c.c. of a lemon-lime flavor carbonated beverage. The sealed containers were allowed to stand with the sealed end in an inverted position for 216 hours at ambient temperature after which time the cans were inspected to determine whether leakage had occurred at the seam between the body and end of the container. No leakage was observed from the containers prepared using the formulation of this example. Six of the 500 containers which had been treated with the commercial sealant exhibited some degree of leakage. Lemon-lime flavor carbonated beverage was selected for this test because it penetrates through any defects in the container more readily than other popular varieties

| Ingredient | Parts; As Aqueous Dispersion | Parts; Dry | Parts; Dry, Based on 100 Parts Elastomer |
|---|---|---|---|
| Hydrated Alumina | 471 | 471 | 78.5 |
| Titanium Dioxide | 57 | 57 | 9.5 |
| Isobutylene-Isoprene Copolymer[1] | 938 | 600 | 100.0 |
| Tackifying Resin[2] | 876 | 350 | 58.3 |
| Thickener[3] | 109 | 43.6 | 7.27 |
| Butyl Zimate[4](Aqueous slurry) | 24 | 12 | 2.0 |
| Surfactant[5] | 0.3 | 0.1 | 0.02 |
| Anti-Foam Agent[6] | 0.1 | 0.1 | 0.02 |
| Carbon Black | 1.5 | 0.5 | 0.1 |
| Deionized Water | 528.0 | — | — |
| Ammonium Hydroxide (28% by weight solution based on NH$_3$) | 27.0 | — | — |

[1] An aqueous latex of a isobutylene (98%)-isoprene(2%) available as BP-100 from the Exxon Chemical Company.
[2] An aqueous dispersion containing 40% of an ester derived from rosin acids and a polyhydric alcohol (TC-2037, available from Hercules, Incorporated).
[3] An aqueous emulsion of a copolymer containing 27% acrylic acid, available as Acrysol ASE75 from the Rohm and Haas Company, Philadelphia, Pa.
[4] Zinc di-n-butyl dithiocarbamate.
[5] The sodium salt of a polymerized carboxylic acid available as Tamol 850 from the Rohm and Haas Company.
[6] A blend of fatty acid esters of condensed polyalcohols available as Nalco 212 from the Nalco Chemical Company.

The foregoing sealant formulation was prepared by adding the surfactant to deionized water. To the resultant mixture was added the hydrated alumina and titanium dioxide. The mixture was stirred during the addiof carbonated beverages, including cola flavored types.

What is claimed is:

1. In an improved sealant composition for metal containers, said composition consisting essentially of an aqueous dispersion comprising 100 parts by weight of a dispersed elastomeric polymer selected from the group consisting of natural rubbers and synthetic rubbers; between 30 and 75 parts of a tackifying resin; between 5 and 20 parts of a thickener; and between 30 and 100 parts of a filler selected from the group consisting of hydrated alumina, silica, and zinc oxide, wherein the concentration of dissolved and dispersed solids in the sealant composition constitutes between 35 and 70 percent by weight of said composition, the improvement which resides in selecting the thickener from the group consisting of copolymers wherein between 25 and 60 percent by weight of the repeating units are derived from the ammonium salt of acrylic or methacrylic acid, any remaining repeating units being derived from esters of acrylic acid or methacrylic acid with alcohols containing between 1 and 20 carbon atoms.

2. An improved sealant composition as described in claim 1 wherein the elastomeric polymer is a copolymer of isobutylene and isoprene.

3. An improved sealant composition as described in claim 1 wherein the filler is hydrated alumina.

4. An improved sealant composition as described in claim 1 wherein the tackifying resin is a salt or ester of rosin acids.

5. An improved sealant composition as described in claim 1 wherein said ammonium salt is ammonium acrylate.

6. An improved sealant composition as described in claim 5 wherein repeating units derived from ammonium acrylate constitute 27 percent by weight of the thickener.

* * * * *